(12) United States Patent
Lisetskiy et al.

(10) Patent No.: US 7,884,043 B2
(45) Date of Patent: Feb. 8, 2011

(54) SORBENT FOR REMOVING HEAVY METAL IONS FROM WATER

(75) Inventors: Vladimir N. Lisetskiy, Tomsk (RU); Tatyana A. Lisetskaya, Tomsk (RU); Lidija N. Merkuscheva, Tomsk (RU)

(73) Assignee: Nikolay Aleksandrovich Badulin, Moscow (RU)

( * ) Notice: Subject to any disclaimer, the term of this patent is extended or adjusted under 35 U.S.C. 154(b) by 0 days.

(21) Appl. No.: 12/494,739

(22) Filed: Jun. 30, 2009

(65) Prior Publication Data

US 2009/0264280 A1 Oct. 22, 2009

Related U.S. Application Data

(63) Continuation of application No. PCT/RU2007/000713, filed on Dec. 17, 2007.

(30) Foreign Application Priority Data

Jan. 9, 2007 (RU) ............................... 2007101008

(51) Int. Cl.
   *B01J 29/06* (2006.01)
(52) U.S. Cl. ...................... 502/60; 502/63; 502/64; 502/68; 502/400; 502/406
(58) Field of Classification Search ............... 502/60, 502/63, 64, 68, 400, 406
See application file for complete search history.

(56) References Cited

U.S. PATENT DOCUMENTS

| 6,921,732 | B2 | 7/2005 | Vempati | |
| 2004/0168985 | A1* | 9/2004 | Vempati | ................... 210/668 |

FOREIGN PATENT DOCUMENTS

| RU | 2051112 C1 | 12/1995 |
| RU | 2168357 C2 | 6/2001 |
| RU | 2242276 C1 | 12/2004 |
| RU | 2275916 C1 | 5/2006 |

OTHER PUBLICATIONS

International Search Report, mailed Mar. 6, 2008, from International Application No. PCT/RU2007/000713, filed Dec. 17, 2007.

* cited by examiner

*Primary Examiner*—Elizabeth D Wood
(74) *Attorney, Agent, or Firm*—Houston Eliseeva, LLP

(57) ABSTRACT

The invention relates to sorption materials for removing of heavy metal ions from ground water and surface aquifer systems, and can be used by enterprises in chemical and metallurgical industry which utilize etching and galvanic technologies. The sorbent for removing of heavy metal ions from water is composed of ground zeolite and nanophase material, where the nanophase material consists of nanophase iron hydroxide and nanophase boehmite in the following ratio, mass %:

| Nanophase iron hydroxide | 12-18 |
| Nanophase boehmite | 5-13 |
| Ground zeolite | the rest. |

Technical result is the enhanced purification effectiveness of the sorbent due to a wider range of heavy metals it can absorb when purifying highly contaminated water.

2 Claims, 1 Drawing Sheet

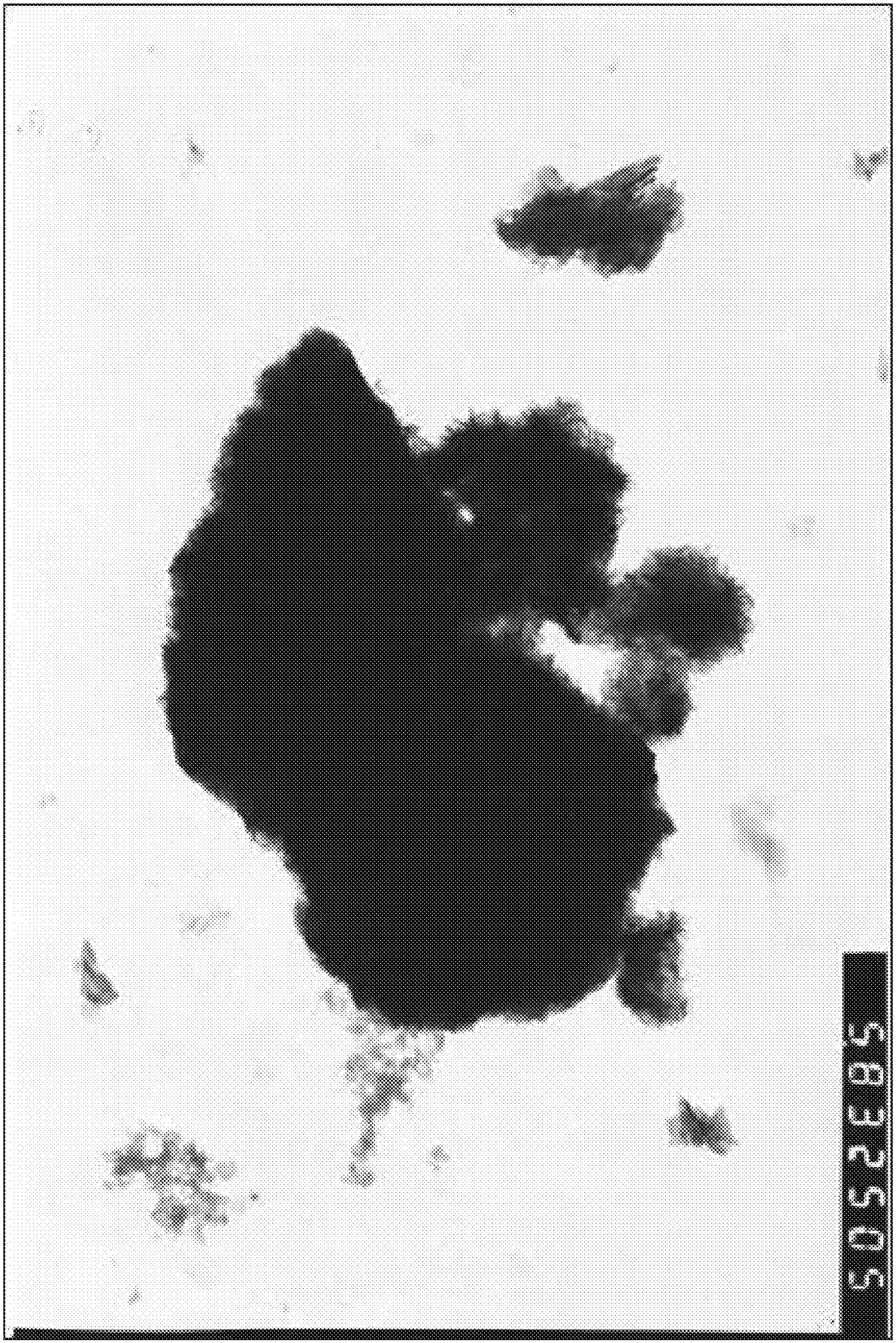

SORBENT FOR REMOVING HEAVY METAL IONS FROM WATER

RELATED APPLICATIONS

This application is a Continuation of International Application No. PCT/RU2007/000713, filed Dec. 17, 2007, which claims priority to Russian Patent Application No. 2007101008, filed Jan. 9, 2007, both of which are incorporated herein by reference in their entirety.

FIELD OF THE INVENTION

The invention relates to sorption materials for removing of heavy metal ions from ground water and surface aquifer systems, and can be used by enterprises in chemical and metallurgical industry which utilize etching and galvanic technologies.

BACKGROUND OF THE INVENTION

RU Pat. No. 2051112, IPC 6 C02F1/28, issued Dec. 27, 1995, discloses a sorbent comprising a layer of zeolite treated with oxalic acid solution (0.05-0.1 mole/L) in admixture with mineral acid and brought to pH 1-2. When wastewater containing ions of heavy metals flows through a layer of the sorbent, the following level of ions removing from water is achieved: Cr (III) and Cr (VI) to 100%, Cu (II) to 98.2%, Fe (II, III) to 99.2%, Zn (II) to 98.1%.

However, the sorbent has a substantial disadvantage in that it cannot remove ions of arsenic from water, while it is found virtually in all underground and surface water sources and is extremely toxic for living organisms.

U.S. Pat. No. 6,921,732, IPC B01J 20/06, issued Jul. 26, 2005, discloses another well-known sorbent, similar to the abovementioned one in technical substance and effect, which can remove ions of arsenic (with different valence) from water. The sorbent is composed of zeolite covered with nanophase iron and manganese oxides, where 0.25-10% is iron oxide in 0.10 mole ratio of Mn/(Mn+Fe). The sorbent is produced by adding zeolite to iron-manganese solution (iron oxide solution mixed with manganiferous compound). The resultant mixture is filtered, the filtered product is dehumidified, and the final substance is the sorbent which is composed of zeolite covered with nanophase iron and manganese hydroxides.

The prototype-sorbent has the following disadvantages. It can only remove ions of arsenic, and cannot be used to remove ions of other heavy metals from water. In addition, the maximum water contamination level which allows for high degree purification is relatively low: 1.57 mg/L (ppm). Moreover, while removing ions of As(III) which is very common in nature, the sorbent releases ions of manganese Mn(II) which contaminate water.

SUMMARY OF THE INVENTION

The claimed invention is intended to solve the problem of development of a sorbent for removing of heavy metal ions from water, which would have enhanced water purification effectiveness.

This is achieved by that the sorbent for removing of heavy metal ions from water is composed of ground zeolite and nanophase material, the latter consisting of nanophase iron hydroxide and nanophase boehmite in the following ratio, mass %:

| | |
|---|---|
| Nanophase iron hydroxide | 12-18 |
| Nanophase boehmite | 5-13 |
| Ground zeolite | the rest. |

The sorbent for removing of heavy metal ions from water which is composed of ground zeolite and nanophase material, where the latter consists of nanophase iron hydroxide and nanophase boehmite in the above-described ratio, has enhanced water purification effectiveness due to a wider range of heavy metals it can absorb when purifying highly contaminated water to a high level of purity. The claimed sorbent absorbs not only anions of arsenic (III), arsenic (V) and chromium (VI), but also cations of cadmium, copper, lead. The maximum contaminant concentration in treated water for the sorbent is 5 mg/L, which is 3.2 times higher than that for the prototype-sorbent. Moreover, when used, the sorbent does not release ions of manganese, which also is a water contaminant, but only absorbs ions of arsenic.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

The FIG. 1 shows an electron photograph of a sample of the claimed sorbent.

DETAILED DESCRIPTION OF THE PREFERRED EMBODIMENTS

Embodiment 1

To produce the claimed sorbent, one takes a 3 g weighed portion of zeolite having the following chemical composition, %: $SiO_2$—64.79, $H_2O$—12.85, $Al_2O_3$—12.75, CaO—1.89, MgO—1.50, $Fe_2O_3$—1.40, $K_2O$—1.26, $Na_2O$—0.44, $CaF_2$—0.03, $TiO_2$—0.02, and having mean clinoptilolite content of 60%. The weighed portion of zeolite is mixed with 0.53 g (corresponds to 13%) of nanophase boehmite and 0.62 g (corresponds to 15%) of nanophase iron hydroxide. The resultant mixture is ground in an agate mortar for 5 minutes, and then dried in a drying furnace for 6 hours at 190° C.

The nanophase boehmite results from the reaction between aluminum powder and water in alkalescent medium. To produce it one takes a 0.238 g weighed portion of aluminum powder with fine plate-like particles. The weighed portion is put in 125 mL of distilled water where one adds 2 mL of strong $NH_4OH$ solution to alkalize the medium. The resultant mixture is heated to 50° C. and then left off until the reaction between aluminum powder and water is complete. After that the resultant sediment is filtered with a Buchner funnel and a water-jet pump, and then washed until brought to neutral pH.

The sediment is dried in a drying furnace for 2 hours at 50-75° C., and then for 6 hours at 160° C. The X-ray phase analysis of a sample is preformed with an X-ray diffractometer and with the use of copper R-radiation with 1.54178 Å wavelength and a nickel beta-filter. Diffractometric measures show that the crystalline phase of the sample is a nanophase boehmite (Table 1). No admixtures of other crystalline phases were detected.

Analysis of the sample with a transmission electron microscope has shown that the nanophase boehmite sample is composed of 2-5 nm thick and up to 200 nm long needle-shaped nanoparticles.

Nanophase iron hydroxide $Fe(OH)_3$ is produced in the form of as-deposited gel by means of reaction between iron chloride and $NH_4OH$ solutions. Analysis of the sample with an electron microscope has shown that it is composed of 50-200 nm amorphous particles.

TABLE 1

| Diffraction line No. | Experimental value of interplanar spacing dexp., Å | Reference value of interplanar spacing dref, Å (ASTM #21-1307) for AlOOH (boehmite) |
| --- | --- | --- |
| 1 | 6.1 | 6.11 |
| 2 | 3.167 | 3.164 |
| 3 | 2.348 | 2.346 |
| 4 | 1.98 | 1.983 |
| 5 | 1.865 | 1.86 |
| 6 | 1.847 | 1.85 |

Embodiment 2

To produce the claimed sorbent, a 3 g weighed portion of zeolite having the following chemical composition, %: $SiO_2$—64.79, $H_2O$—12.85, $Al_2O_3$—12.75, CaO—1.89, MgO—1.50, $Fe_2O_3$—1.40, $K_2O$—1.26, $Na_2O$—0.44, $CaF_2$—0.03, $TiO_2$—0.02 and having mean clinoptilolite content of 60%, is ground in an agate mortar for 5 minutes and then put in 125 mL of distilled water. Then one adds 0.238 g of aluminum powder with fine plate-like particles and 2 mL of strong $NH_4OH$ solution to alkalize the medium. The resultant mixture is heated to 50° C. and then left off until the reaction between aluminum powder and water is complete. The resultant mixture is acidified to pH=4 by adding hydrochloric acid. Then one adds 53.04 mL of $FeCl_3.6H_2O$ solution (29.59 g/L) while stirring, and then 5.1 mL of concentrated $NH_4OH$ while stirring. After the resultant mixture has cooled, it is filtered with a Buchner funnel and a water-jet pump, and then washed until brought to neutral pH. The sediment of the sorbent is dried in a drying furnace for 2 hours at 50-75° C., and then for 6 hours at 190° C.

As a result, there is a sorbent which consists of ground zeolite and nanophase material, where the latter is composed of nanophase iron hydroxide (corresponding to 15% of nanophase iron hydroxide) and nanophase boehmite (corresponding to 13% of nanophase boehmite). The sorbent is analyzed with an electron microscope. The electron photograph shows that the 1-8 micrometer particles of zeolite are covered by the needle-shaped particles of nanophase boehmite and by amorphous particles of nanophase iron hydroxide.

Therefore, the produced sample is composed of relatively large particles of zeolite covered by the nanophase material, and contains virtually no free nanoparticles. This results in reduced clogging of filtered materials and decreased water pressure loss during the subsequent use of the sorbent.

Embodiment 3

To produce the claimed sorbent, a 3 g weighed portion of zeolite having the following chemical composition, %: $SiO_2$—64.79, $H_2O$—12.85, $Al_2O_3$—12.75, CaO—1.89, MgO—1.50, $Fe_2O_3$—1.40, $K_2O$—1.26, $Na_2O$—0.44, $CaF_2$—0.03, $TiO_2$—0.02 and having the mean clinoptilolite content of 60%, is ground in an agate mortar for 5 minutes and then put in 125 mL of distilled water. Then one adds 0.081 g of aluminum powder with fine plate-like particles and 2 mL of strong $NH_4OH$ solution to alkalize the medium. The resultant mixture is heated to 50° C. and then left off until the reaction between aluminum powder and water is complete. The resultant mixture is acidified to pH=4 by adding hydrochloric acid. Then one adds 36.76 mL of $FeCl_3.6H_2O$ solution (29.59 g/L) while stirring, and then 3.5 mL of concentrated $NH_4OH$ while stirring. After the resultant mixture has cooled, it is filtered with a Buchner funnel and a water-jet pump, and then washed until brought to neutral pH. The sediment of the sorbent is dried in a drying furnace for 2 hours at 50-75° C., and then for 6 hours at 190° C. As a result, there is a sorbent which consists of ground zeolite and nanophase material, where the latter is composed of nanophase iron hydroxide (corresponding to 12% of nanophase iron hydroxide) and nanophase boehmite (corresponding to 5% of nanophase boehmite).

Analysis of the produced samples to determine their heavy metal ions adsorption capacity is preformed in the following manner.

Analysis of As(III) ions absorption is performed with test solution (2.5 mg/L). A 200 mg weighed portion of the sorbent is put in 20 mL of the test solution (pH=6) and is stirred with a magnetic stirrer for 30 minutes. Then the solution is left to settle for 10-15 minutes, after which it is analyzed with the stripping voltammetry method for residual ions of $AsO_3^{3-}$. For this purpose the solution aliquot (0.2-0.5 mL) is placed in a cell with bulk electrolyte with proven purity. Gold film electrode with a graphite carrying base is used as a working electrode, while 0.3 M of hydrochloric acid is used as a background. Oxygen does not need to be removed since the peak of arsenic anodic oxidation occurs prior to the potential of oxygen reduction. Accumulation of arsenic on the electrode in the form of an intermetallic compound with gold continues for 60 second at E=−1.0 V. Volt-ampere curves are run in a direct-current mode with a computer-compatible analyzer. The analyzer has 3 electrochemical cells for simultaneous experiments and a mercury-quartz lamp for UV irradiation if necessary. Three aliquot parts of the same test solution are analyzed simultaneously. Residual ions concentration is an average value for these three simultaneous experiments. The concentration is valued by adding 0.1 mL of $AsO_3^{3-}$ standard solution (2.5 mg/L). Minimum detectable concentration is 0.001 mg/L. Sorption percentage is calculated with the initial concentration of $AsO_3^{3-}$ taken to be 100%. Data on sorption capacity of the claimed sorbent with different content of nanophase boehmite and nanophase iron hydroxide is presented in Table 2.

TABLE 2

| Sample | Quantity of $Fe(OH)_3$, % | Quantity of nanophase boehmite, % | % of sorption |
| --- | --- | --- | --- |
| 1 | 15 | 0 | 67.9 ± 1.0 |
| 2 | 15 | 5 | 100 |
| 3 | 15 | 10 | 100 |
| 4 | 15 | 13 | 100 |
| 5 | 15 | 15 | 99.8 ± 0.1 |
| 6 | 0 | 13 | 8.0 ± 1.0 |
| 7 | 5 | 13 | 92.8 ± 0.4 |
| 8 | 10 | 13 | 97.6 ± 0.1 |
| 9 | 12 | 13 | 100 |

TABLE 2-continued

| Sample | Quantity of Fe(OH)$_3$, % | Quantity of nanophase boehmite, % | % of sorption |
|---|---|---|---|
| 10 | 18 | 13 | 100 |
| 11 | 20 | 13 | 99.8 ± 0.1 |

As shown in Table 2, the best AsO$_3^{3-}$ ions sorption capacity is demonstrated by the sorbent which is composed of nanophase boehmite and nanophase iron hydroxide in the following ratio, mass %: nanophase iron hydroxide—12-18, nanophase boehmite—5-13, zeolite—the rest. The sorbent which contains over 18% or less than 12% of nanophase iron hydroxide and over 13% and less than 5% of nanophase boehmite has degradation of sorption capacity.

Similar results were received with a zeolite having mean clinoptilolite content of 60-70% and mean montmorillonite content of 15-20%.

Sample No. 2 (Table 2) contains 5% of nanophase boehmite and 15% of nanophase iron hydroxide and is similarly used in the experiment, but with a higher AsO$_3^{3-}$ ions concentration (5 mg/L) which is 10 times the maximum allowable concentration (MAC). No ions of AsO$_3^{3-}$ were detected after sorption.

The same procedure is used for analysis of sorbent samples for adsorption of other heavy metal ions (5 times the MAC): Cd$^{2+}$—0.1 mg/L, Cu$^{2+}$—2.5 mg/L, Pb$^{2+}$—0.3 mg/L, AsO$_4^{3-}$—2.5 mg/L, CrO$_4^{2-}$—1.0 mg/L. Catons are analyzed with a mercury film electrode with a silver carrying base, chromate-anions are analyzed on a working graphite electrode, arsenic (V) anions are analyzed with a gold and graphite electrode. Data supporting the high sorption capacity of the sorbent for ions of different heavy metals is presented in Table 3.

TABLE 3

| Sample | Cd$^{2+}$ | Pb$^{2+}$ | Cu$^{2+}$ | CrO$_4^{2-}$ | AsO$_4^{3-}$ |
|---|---|---|---|---|---|
| No. 3 | 99.0 ± 0.5 | 96.0 ± 0.7 | 98.6 ± 0.2 | 100 | 99.0 ± 1.0 |
| No. 3 after a day of adsorption | 100 | 98.0 ± 1.0 | 100 | 100 | 100 |

INDUSTRIAL APPLICABILITY

The claimed sorbent for removing of heavy metal ions from water has demonstrated enhanced purification effectiveness due to a wider range of heavy metals it can absorb when purifying highly contaminated water to a high level of purity. The claimed sorbent can be used for removing of heavy metal ions from groundwater and surface aquifer systems and can also be used by enterprises in chemical and metallurgical industry which utilize etching and galvanic technologies.

While this invention has been particularly shown and described with references to preferred embodiments thereof, it will be understood by those skilled in the art that various changes in form and details may be made therein without departing from the scope of the invention encompassed by the appended claims.

What is claimed is:

1. A sorbent for removal of heavy metal ions from water, consisting of
   ground zeolite,
   nanophase iron hydroxide being 12-18% of the sorbent by mass, and
   nanophase boehmite being 5-13% of the sorbent by mass;
   wherein the zeolite comprises about 64.79% of SiO$_2$, about 12.85% of H$_2$O, about 12.75% of Al$_2$O$_3$, about 1.89% of CaO, about 1.50% of MgO, about 1.40% of Fe$_2$O$_3$, about 1.26% of K$_2$O, about 0.44% of Na$_2$O, about 0.03% of CaF$_2$, about 0.02% of TiO$_2$, and
   wherein the zeolite has a mean clinoptilolite content of about 60%.

2. A sorbent for removal of heavy metal ions from water comprising:
   nanophase iron hydroxide being 12-18% of the sorbent by mass;
   nanophase boehmite being 5-13% of the sorbent by mass; and
   the rest of the sorbent comprising at least 60% of clinoptilolite by mass.

* * * * *